US007637814B2

(12) United States Patent
Snow et al.

(10) Patent No.: US 7,637,814 B2
(45) Date of Patent: Dec. 29, 2009

(54) PROCESSING PLATFORM FOR A GAMING MACHINE

(75) Inventors: Richard Snow, Reno, NV (US); Stephen Shaffer, Reno, NV (US)

(73) Assignee: IGT, Reno, NV (US)

( * ) Notice: Subject to any disclaimer, the term of this patent is extended or adjusted under 35 U.S.C. 154(b) by 1498 days.

(21) Appl. No.: 09/338,286

(22) Filed: Jun. 22, 1999

(65) Prior Publication Data

US 2002/0082084 A1 Jun. 27, 2002

(51) Int. Cl.
*G06F 19/00* (2006.01)

(52) U.S. Cl. ............................ 463/42; 463/16; 463/40; 463/43

(58) Field of Classification Search ............. 463/16–20, 463/39–43, 25–27; 273/138.1, 138.2, 143 R, 273/148 B, 138 A
See application file for complete search history.

(56) References Cited

U.S. PATENT DOCUMENTS 4,283,709 A * 8/1981 Lucero et al. ................. 463/42
5,114,155 A * 5/1992 Tillery et al. ............. 273/138.1
5,611,730 A * 3/1997 Weiss .......................... 463/20
5,655,961 A * 8/1997 Acres et al. ................... 463/27
5,770,533 A * 6/1998 Franchi ........................ 463/42
5,788,509 A * 8/1998 Byers et al. ................... 439/61
5,833,538 A * 11/1998 Weiss .......................... 463/21
5,876,284 A * 3/1999 Acres et al. ................... 463/25
5,917,725 A * 6/1999 Thacher et al. ......... 340/323 R
6,071,190 A * 6/2000 Weiss et al. ................... 463/25
6,099,408 A * 8/2000 Schneier et al. ............... 463/29
6,110,043 A * 8/2000 Olsen .......................... 463/27
6,217,448 B1 * 4/2001 Olsen .......................... 463/25

OTHER PUBLICATIONS

Microsoft Press Computer Dictionary, 3rd Edition, copyright 1997, pp. 34, 183-184,248,265,315.*
Newtons Telecom Dictionary, Harry Newton, copyright 1998, pp. 25, 279, 464, 537, 782.*
Newtons Telecom Dictionary, 1998, p. 751, Harry newton, Flatiron Publishing.*

* cited by examiner

*Primary Examiner*—James S McClellan
(74) *Attorney, Agent, or Firm*—Weaver Austin Villeneuve & Sampson LLP

(57) ABSTRACT

A processing platform for operation of a gaming machine. The processing platform includes a gaming processing subsystem for controlling functional aspects of gaming machine operation and a general computing subsystem for controlling non-functional aspects of gaming machine operation. The gaming processing subsystem and the general computing subsystem are physically separate from one another and are coupled to a bus included within the processing platform.

9 Claims, 2 Drawing Sheets

PROCESSING PLATFORM FOR A GAMING MACHINE

BACKGROUND OF THE INVENTION

1. Field of the Invention

The present invention relates to a processing platform for operation of a gaming machine, and more particularly, to a processing platform for operation of a gaming machine that includes a general computing subsystem and a gaming processing subsystem.

2. Description of the Prior Art

Slot machine designs are growing in complexity. Regulation and control of modern gaming devices has also correspondingly become complex. Thus, protecting the public from improper machine operation has become a daunting task. Regulation aimed at close control of slot machine design has resulted in greater machine design diversity thereby compounding the complexity of machine control.

Various bodies of gaming law have a variety of technical and legal requirements. These requirements impact slot machine designs in many ways. Security, randomness, payback percentage, game play history, code verification and accounting for all facets of game operation are commonly regulated operational characteristics of slot machines. These regulations often limit slot machine designers. To meet technical requirements, engineers are often faced with complex operations. These operations delay machine start up, lead to complex human attendant operations, and increase opportunity for error.

In current gaming machines, processing platforms are adopted to allow various player features while also supporting features required by various gaming regulatory bodies. As computer and computer software advancements are made, gaming machine manufacturers constantly update designs for complete gaming platforms that require extensive engineering effort and time consuming regulatory submittal and testing. The constant re-design and engineering results in diverse implementations of regulated machine functions that are fundamental elements of any gaming device. This constant re-design and engineering results in great expense. The diversity of these implementations causes increased complexity for operators and regulatory agencies.

SUMMARY OF THE INVENTION

A processing platform for operation of a gaming machine in accordance with the present invention includes a bus, a gaming processing subsystem for controlling aspects of gaming machine operation that involve game functionality and thus are generally subject to regulation coupled to the bus and a general computing subsystem for controlling aspects of gaming machine operation that do not involve game functionality and thus are not generally subject to regulation. The general computing subsystem is also coupled to the bus and the gaming processing subsystem is physically separate from the general computing subsystem.

In accordance with one aspect of the present invention, the bus uses an interface protocol that consists of one of PCI, ISA, VME and AGP.

In accordance with another aspect of the present invention, the aspects of gaming machine operation that involve game functionality and are more likely to be the subject of regulation include game play history, game accounting, gaming machine access, I/O control, random number generation and game authentication algorithms.

In accordance with a further aspect of the present invention, the aspects of gaming machine operation that do not involve game functionality and are less likely to be the subject of regulation include player visual display and attract animation, audio player feedback and attraction, real time video presentations, and commercial operating systems.

Accordingly, the processing platform for operation of a gaming machine in accordance with the present invention allows for the processing to be performed by two physically separate subsystems, one directed to the actual gaming processing and the other directed to general computing processing. Thus, gaming regulatory agencies will be able to regulate and approve the gaming processing subsystem with regard to, for example, functional aspects of gaming related to game play history, gaming accounting, gaming machine access, input/output control, random number generation, game authentication algorithms, and general issues related to gaming and money, such as pay tables, that are necessary for protecting players, i.e., consumers. At the same time, gaming machine manufacturers are able to improve and upgrade gaming machines with ever improving hardware and software for better graphics and sound related to playing the game, graphics and sound for attracting players to the game, and other aspects generally related to non-functional entertainment features with the gaming machines. Hence, once a regulatory agency approves a gaming processing subsystem, that game processing subsystem may be used with general computing subsystems to control and operate gaming machines. Accordingly, gaming machines can quickly and easily be upgraded, changed, and developed with a reduced need for gaming regulatory agency testing and approval.

DETAILED DESCRIPTION OF THE PREFERRED EXEMPLARY EMBODIMENTS

Figure 1:
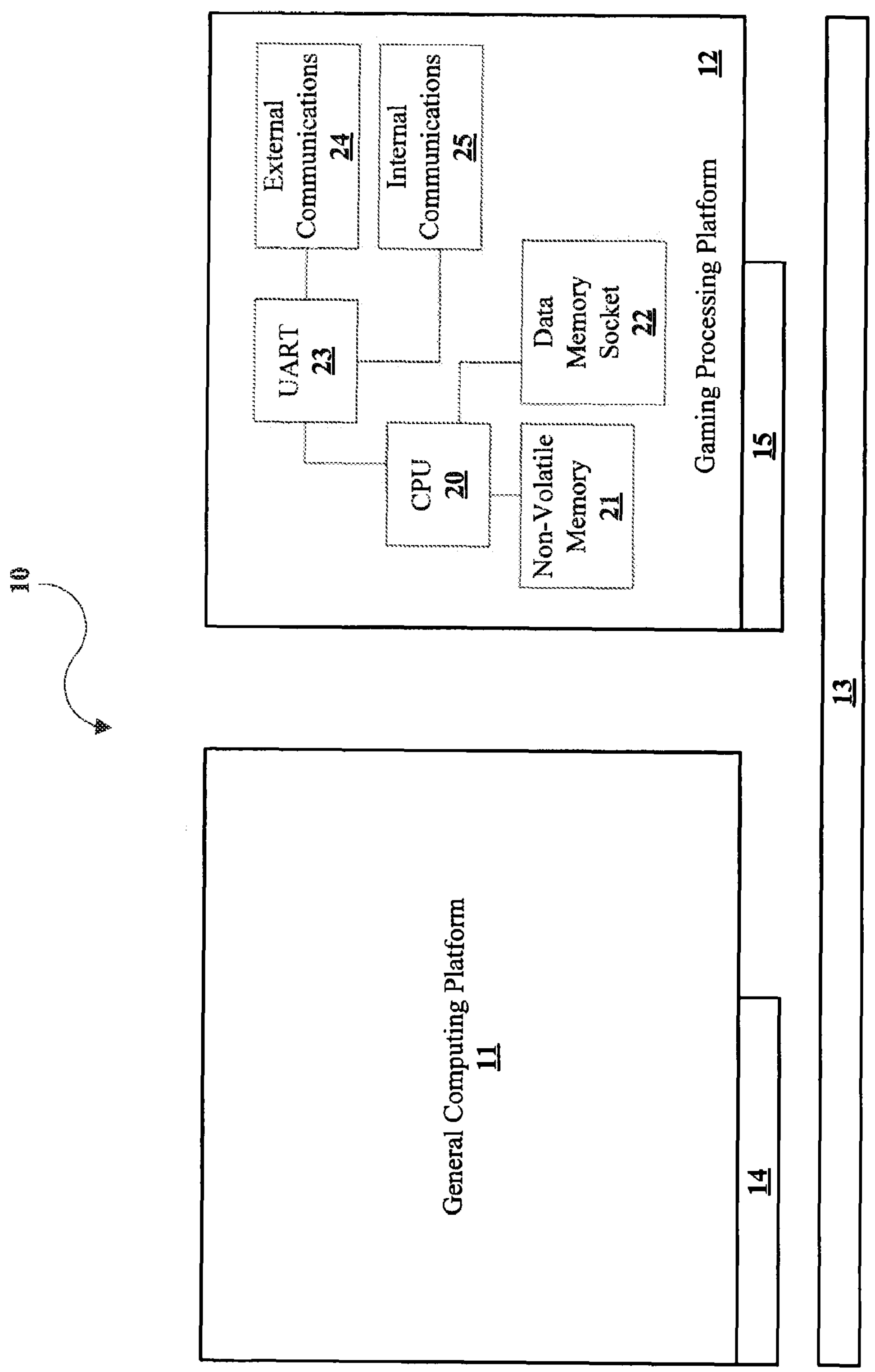
FIG. 1 is a schematic illustration of a processing platform for operation of a gaming machine in accordance with the present invention.

A processing platform 10 for operation of a gaming machine is schematically illustrated in FIG. 1. The processing platform is preferably subdivided into two separate primary subsystems 11, 12 coupled to bus 13. General computing platform 11 controls software and hardware needed to support display, sound and other non-gaming critical functions while gaming processing platform 12 controls primary gaming operations.

Preferably, the general computing platform or subsystem consists of a common PC-type personal computer and therefore preferably consists of a PCI type expansion card that includes bus interface 14. The general computing platform may consist of multiple cards if desired or needed. Preferably, general computing platform 11 communicates with gaming processing platform 12 with a series of software driven API-type calls. The general computing subsystem preferably controls or operates, for example, player visual displays and attraction animation features of the gaming machine; audio player feedback in player attraction features of the gaming machine; real time video presentations; and any commercial operating system present within the gaming machine.

Gaming processing platform or subsystem 12 is preferably also constructed on a standard PCI type expansion card that includes bus interface 15. Preferably, the gaming processing platform consists of a single card, but may consist of multiple cards if desired. This peripheral component interface serves as the controller of all gaming specific operations. These gaming operations preferably include, for example, game play history, i.e., what is played, what has been displayed, etc.; game accounting, i.e., money coming in and out; gaming machine access, i.e., doors opening on the gaming machine, when the door was opened, etc.; input/output control, i.e., user interface, such as buttons, handles, coin acceptors; random number generation; and game authentication algorithms. Accordingly, it should be apparent that gaming processing platform 12 generally controls gambling or gaming aspects associated with the gaming machine or system that are typically important to the integrity and security of the game, and thus generally are subject to regulation by gaming authorities or gaming regulation agencies.

The gaming processing subsystem board preferably consists of a PCI half-length card. This card may be fitted to any processor architecture that supports PCI. The gaming processing card will have a processor 20, which will control the gaming machine I/O including communications. Additionally, the gaming processing card preferably will include all gaming random number generation functionality, data table information that pertains to payout information stored in a non-volatile memory area 21. This design of a gaming processing platform allows any PC or other processor architecture to be quickly adopted as a gaming machine platform and minimizes any custom or in-house nonstandard work, such as software and hardware relating to improved graphics and sounds for general computing operations. Because all game outcome and paying information is generated, backed-up and controlled on the gaming processing platform, a reduction in the number of gaming approvals by gaming regulatory agencies may be achieved.

The gaming processing board also preferably includes a data memory socket 22 that accommodates existing data proms from older gaming devices, such as S-Plus machines (SSPROMs) and PE-Plus machines (XP type data proms), both manufactured by International Game Technology. Since all communications are coupled to hardware on the gaming processing board, money devices, such as bill validators, are ultimately controlled by the gaming processing board.

Preferably, the gaming processing board further includes serial UARTS 23 that are part of the input/output control. Serial UARTS communicate with the various games and communicate various information in and out of the game. Furthermore, the gaming processing board also includes the controls 24 for communications external of the gaming machine, for example, information relating to large progressive jackpots among a general type of machine, i.e., when the machines are part of a larger gaming subsystem, and information relating to the amount of coins in, coins out and wins being fed to a central computing location.

Figure 2:
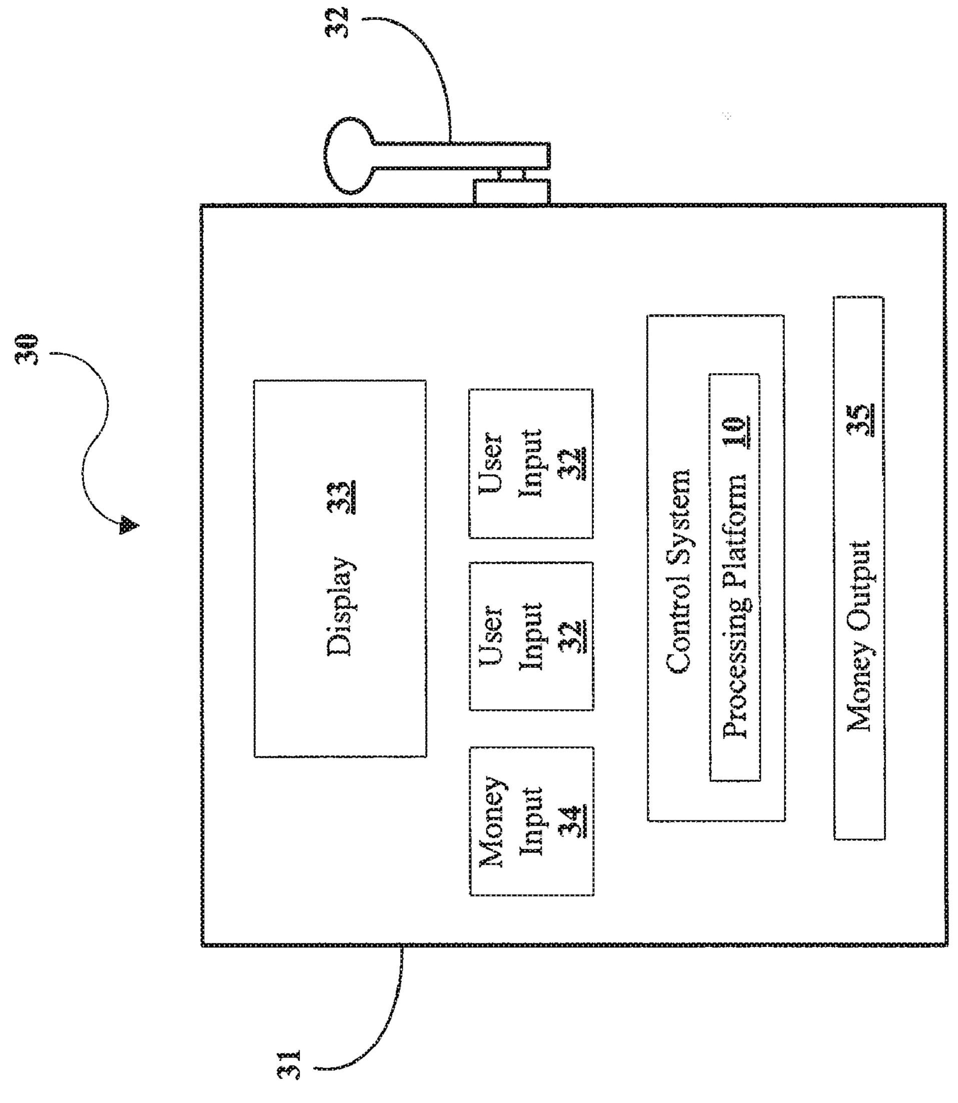
FIG. 2 is a schematic illustration of a gaming machine including a processing platform for operation thereof in accordance with the present invention.

FIG. 2 illustrates a gaming machine 30 that includes a housing 31, at least one user input 32 coupled to the housing, a display 33, such as, for example, a CRT, LCD or plasma display, coupled to the housing, a money input (for example, coin slot, bill validator, coupon acceptor, smart card reader, credit/debit card reader, or the other devices for accepting currency or credit), and a money output 35 (for example, coin chute, ticket printer, smart card writer, or other devices for issuing currency or credit). The gaming machine includes a control system that includes processing platform 10 consisting of gaming processor subsystem and the general computing subsystem 11.

Accordingly, the present invention provides a processing platform for operation of a gaming machine and allows for the creation and approval of various gaming processing subsystems or boards that can be coupled with general computing subsystems or boards that control features of the gaming machine operation that are not essential to regulatory aspects of the device. Therefore, these general computing subsystems or boards may be continually and easily changed and upgraded. This allows for rapid and easy development of gaming machines to continually upgrade the appeal and entertainment factors related to gaming machines. Furthermore, a processing platform for operation of a gaming machine in accordance with the present invention allows for better security with respect to gaming aspects while allowing a completely open architecture gaming platform.

The present invention has been described using the standard PCI computing interface. However, those skilled in the art will recognize that other standard computing interfaces, such as, for example, ISA, VME, and AGP may also be employed. Furthermore, the present invention has been described with respect to being contained within a gaming machine. Those skilled in the art will recognize that any or all of the processing platform may be external to the gaming machine such as, for example, in the case wherein a central control system exists for controlling one or more gaming machines.

Although the invention has been described with reference to specific exemplary embodiments, it will be appreciated that it is intended to cover all modifications and equivalents within the scope of the appended claims.

What is claimed is:

1. A gaining machine comprising:

a housing;

a user input connected to the housing;

a display connected to the housing; and a control system located within the housing, the control system comprising a processing platform that comprises:

a single mother board, said motherboard comprising;

a first processor;

a memory wherein the first processor and the memory are designed or configured to control and operate one or more of i) visual displays, ii) attraction animation features, iii) audio player feedback, iv) real-time video presentations, v) and operating system and combinations thereof;

one or more buses on the more on the single motherboard wherein each of the one or more bases uses an interface protocol selected from a group consisting of peripheral component interconnect (PCI), industrial standard architecture (ISA), Versa Module Europa (VME), and accelerated graphics port (AGP);

one or more expansion slots for connecting a board to the buses;

a gaming processing subsystem designed to control a game played on the gaming machine, the gaining processing subsystem comprising, a first gaming processing subsystem board connected to one of the buses on the singe motherboard, the first gaining processing subsystem board comprising;

a second processor designed or configured to control the gaming machine and to control Input/Output to the gaming machine;

a non-volatile memory for storing at least payout information;

a data memory socket located on the first gaming processing subsystem board designed to accommodate a data prom; and a bus interface for connecting the first gaming processing subsystem board to one of the buses via one of the expansion slots on the single motherboard wherein the first gaming processing subsystem board is designed to control one or more of: i) a game play history, ii) gaming machine access, iii) user interface devices, iv) money handling devices, v) gaming machine I/O communications, v) random number generation and vi) progressive jackpot information.

2. The gaming machine of claim 1, further comprising:

a second gaming processing subsystem board wherein the first gaming processing subsystem board is designed to control one or more of: i) a game play history, ii) gaming machine access, iii) user interface devices, iv) money handling devices, v) gaming machine I/O communications, v) random number generation and vi) progressive jackpot information.

3. The gaming machine of claim 1, further comprising:

a serial communication connection.

4. The gaining machine of claim 1, wherein the gaming processor subsystem board is a PCI expansion card designed to interface with a PCI bus.

5. The gaming machine of claim 1, wherein the processing platform employs a personal computer processor architecture.

6. The gaming machine of claim 1, wherein the first processor on the mother board and the first gaining processing subsystem board communicate using a software driven application program interface.

7. The gaming machine of claim 1, wherein the first gaining processing subsystem board further comprises:

a serial UART (Universal Asynchronous Receiver/Transmitter).

8. The gaining machine of claim 7, wherein the serial UART is used by the first gaming processing subsystem board to communicate with internal gaming devices, external gaining devices and combinations thereof.

9. The gaming machine of claim 1, wherein the first processing subsystem board further comprises:

a random number generator.

* * * * *

UNITED STATES PATENT AND TRADEMARK OFFICE

CERTIFICATE OF CORRECTION

PATENT NO. : 7,637,814 B2
APPLICATION NO. : 09/338286
DATED : December 29, 2009
INVENTOR(S) : Richard Snow et al.

It is certified that error appears in the above-identified patent and that said Letters Patent is hereby corrected as shown below:

In the Claims:

In claim 1 (column 4, line 32) change “gaining” to --gaming--.

In claim 1 (column 4, line 48) change “bases” to --buses--.

In claim 1 (column 4, line 57) change “gaining” to --gaming--.

In claim 1 (column 4, line 61) change “gaining” to --gaming--.

In claim 4 (column 6, line 1) change “gaining” to --gaming--.

In claim 6 (column 6, line 8) change “gaining” to --gaming--.

In claim 7 (column 6, line 11) change “gaining” to --gaming--.

In claim 8 (column 6, line 15) change “gaining” to --gaming--.

In claim 8 (column 6, line 17) change “gaining” to --gaming--.

Signed and Sealed this
Thirteenth Day of September, 2011

David J. Kappos
*Director of the United States Patent and Trademark Office*